July 18, 1933.    R. W. PATON    1,919,183

PISTON RING

Filed May 1, 1933

Inventor:
Roy W. Paton

Patented July 18, 1933

1,919,183

UNITED STATES PATENT OFFICE

ROY W. PATON, OF HAGERSTOWN, INDIANA, ASSIGNOR TO THE PERFECT CIRCLE COMPANY, OF HAGERSTOWN, INDIANA, A CORPORATION OF INDIANA

PISTON RING

Application filed May 1, 1933. Serial No. 668,847.

My invention relates to piston rings for internal combustion engines and the like.

The principal object of my invention is to provide a novel compression piston ring of the scraper type which accomplishes much better lubrication and greatly reduces oil consumption and blow-by of the gases past the piston rings.

The objects of my invention will more fully appear from the following description, reference being had to the accompanying drawing in which.

Figure 1:
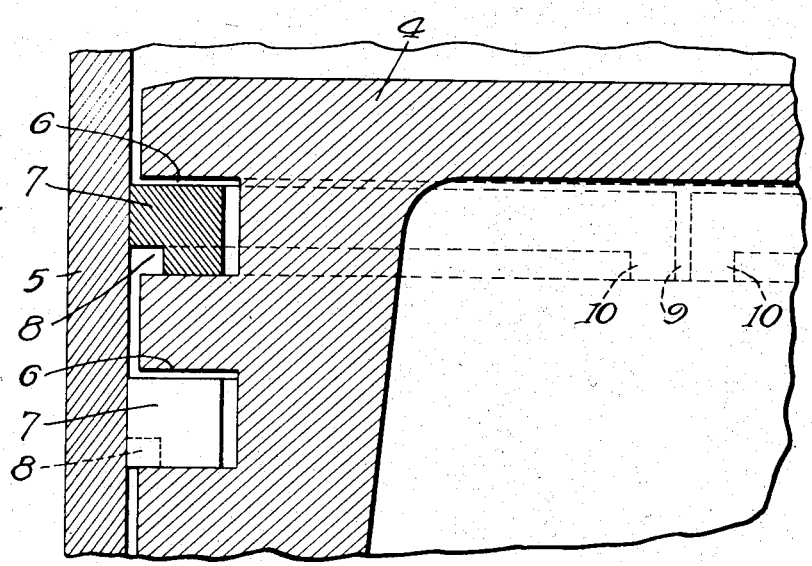
Fig. 1 is a detail vertical section taken through part of a piston and rings embodying my invention.

The piston 4, which operates in the cylinder 5 of the internal combustion engine, may be of any desired form and, as usual, is provided with the usual piston ring grooves 6. Mounted in each groove 6 is a piston ring 7 embodying my invention, though the top ring, if desired, may be of the conventional form which does not have an oil collecting groove.

My ring is provided with a recess or channel 8 in its outer lower corner and the channel is of uniform height and depth throughout. The channel terminates adjacent the ends of the ring, the ring being full-faced at the usual joint or gap 9 formed in the ring. In Fig. 1, the upper ring is shown in cross-section at 90° to the joint 9 and the lower ring has one end shown in elevation. In forming the ring, the lower corner (that is, the outer corner toward the crank case of the engine), except for the dams 10, is cut away by any suitable tool to form the channel 8. Preferably, the ring is rectangular in cross-section and the depth of the ring is substantially one-fourth the thickness of the ring radially and the height of the channel is preferably substantially one-fourth the height of the ring, that is, the thickness of the ring axially. The dams 10 are quite narrow being preferably less in width than the height of the cylinder contacting face of the ring.

Figure 2:
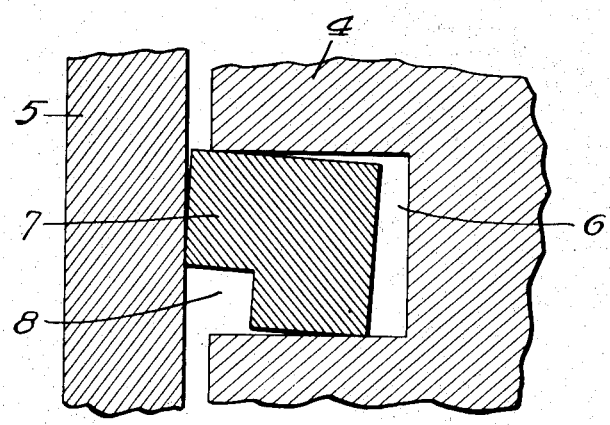
Fig. 2 is an enlarged cross-section through one of the rings, the angularity of the ring with respect to the piston groove and cylinder wall being illustrated in somewhat exaggerated fashion.
Figure 3:
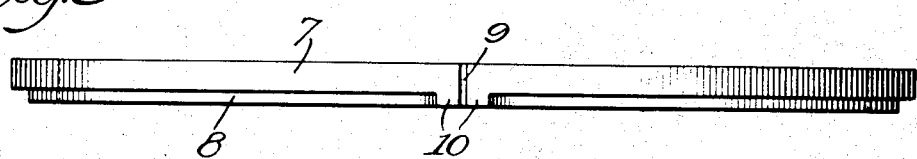
Fig. 3 is an edge elevation of the ring.

I have found that, because of the removal of the metal, to form the channel 8, cross-sectional strains cause the ring, when under compression, to distort or twist with the result that its outer cylindrical face becomes tapered or inclined with respect to the cylinder wall as illustrated somewhat exaggeratedly in Fig. 2.

By a series of comparative actual tests, using my rings and several prior art rings, I find that my improved ring affords better lubrication between the ring and the piston and the ring and the cylinder wall, that the leakage of oil past the ring is greatly reduced and that excessive blow-by of the gases is eliminated. The width of the outer face of the ring is reduced by reason of the channel 8, thus increasing the unit pressure of that face against the cylinder wall. The unbalancing of the section of the ring causes the lower edge of the face of the ring to exert the greatest pressure against the cylinder wall, which enhances the oil scraping action of the ring and affords better sealing of the ring against the cylinder wall. The channel 8 being of uniform height and depth effects more uniform pressure and sealing at the lower edge of the outer face of the ring throughout its circumference. As the channel 8 terminates adjacent the joint of the ring the oil is better trapped in the channel as it cannot escape into the joint and, at the same time, the blow-by is greatly reduced as the gases cannot pass through the joint into the channel 8. Thus, it will be appreciated that a small annular oil reservoir is formed by this channel 8, the cylinder wall and the lower side of the ring groove in the piston. The oil trapped in the reservoir thus causes a substantially uniform seal of the ring at its lower edge with the ring groove and the cylinder wall.

I claim:

1. A compression ring for internal combustion engines having a piston provided with a groove, consisting of a ring split at one point to form a joint and adapted to be mounted in the groove of the piston, the ring having in its outer lower corner a channel and dam portions which terminate the channel adjacent the ends of the ring, the channel being of such uniform height and depth that the oil is substantially equally distributed about the channel to effect a substantially uniform seal with said ring groove and cylinder wall throughout the entire length of the channel, the cylinder contacting face of the ring being reduced by the channel to the extent of the height of the latter.

2. A compression ring for internal combustion engines having a piston provided with a groove, consisting of a ring substantially rectangular in cross-section and split at one point to form a joint and adapted to be mounted in the groove of the piston, the ring having a shallow rectangular channel formed in its outer lower corner, said channel being of such substantially uniform depth and height around the ring, except where it terminates adjacent the joint, that the oil is substantially equally distributed about the channel to effect a substantially uniform seal with said ring groove and cylinder wall throughout the entire length of the channel, the ring being full-faced at the joint.

3. A compression ring for internal combustion engines having a piston provided with a groove, comprising a ring split at one point to form a joint and adapted to be mounted in the groove of the piston, the ring having in its outer lower corner a channel closed by dams adjacent said joint, the channel being of such height and depth whereby the oil is caused to be substantially equally distributed about the channel to effect a substantially uniform seal with said ring groove and cylinder wall throughout the channel.

4. A compression ring for internal combustion engines having a piston provided with a groove, comprising a ring split at one point to form a joint and adapted to be mounted in the groove of the piston, the ring having in its outer lower corner a channel terminated by dams adjacent said joint, the channel being of such minor height and depth relative to the height and thickness of the ring that the oil is caused to be substantially equally distributed about the channel to effect a substantially uniform seal with the ring groove and cylinder wall throughout the channel.

5. A compression ring for internal combustion engines having a piston provided with a groove, comprising a ring split at one point to form a joint and adapted to be mounted in the groove of the piston, the ring having in its outer lower corner a channel terminated by dams adjacent said joint, said channel being of such shape and size as to cause the ring to twist throughout the circumference of the ring and continuously and firmly press the lower edge of the contacting face of the ring against the cylinder wall upon contraction thereof incident to insertion in the cylinder and to cause the oil in the reservoir formed by the channel, the cylinder wall, and the lower side of the ring groove in the piston to substantially uniformly seal the ring at its lower edge with said ring groove and at the cylinder wall.

6. In an internal combustion engine, the combination of a piston provided with a groove, comprising a ring split at one point to form a joint and mounted in the groove of the piston, the ring having in its outer lower corner a rectangular channel and dams at the joint terminating the channel, the dams being narrower circumferentially than the height of the cylinder contacting face, and the channel being of such uniform height and depth and not more than one-third the height and depth of the ring whereby an oil reservoir is formed by the channel, the cylinder wall and lower side of the ring groove to seal the ring at its lower edge with the ring groove and at the cylinder wall.

ROY W. PATON.